United States Patent
DeRose et al.

(10) Patent No.: US 8,368,712 B2
(45) Date of Patent: Feb. 5, 2013

(54) MESH TRANSFER IN N-D SPACE

(75) Inventors: Tony DeRose, San Rafael, CA (US);
Mark Meyer, San Francisco, CA (US);
Sanjay Bakshi, Oakland, CA (US)

(73) Assignee: Pixar, Emeryville, CA (US)

(*) Notice: Subject to any disclaimer, the term of this patent is extended or adjusted under 35 U.S.C. 154(b) by 833 days.

(21) Appl. No.: 12/200,727

(22) Filed: Aug. 28, 2008

(65) Prior Publication Data

US 2010/0053186 A1 Mar. 4, 2010

(51) Int. Cl.
*G09G 5/00* (2006.01)
*G06T 15/00* (2006.01)
*G06T 17/00* (2006.01)

(52) U.S. Cl. .................. 345/581; 345/419; 345/420

(58) Field of Classification Search .................. None
See application file for complete search history.

(56) References Cited

U.S. PATENT DOCUMENTS

| | | | |
|---|---|---|---|
| 6,256,038 B1 | 7/2001 | Krishnamurthy | |
| 6,738,062 B1 | 5/2004 | Moreton | |
| 2002/0143419 A1 | 10/2002 | Praun et al. | |
| 2006/0013505 A1 | 1/2006 | Yau et al. | |
| 2006/0267978 A1* | 11/2006 | Litke et al. | 345/419 |
| 2007/0024632 A1* | 2/2007 | Couture-Gagnon | 345/581 |
| 2007/0176923 A1 | 8/2007 | Lee et al. | |
| 2010/0053172 A1 | 3/2010 | DeRose et al. | |

FOREIGN PATENT DOCUMENTS

| | | | |
|---|---|---|---|
| WO | WO 2007/087445 A2 | 8/2007 | |
| WO | WO 2007/087445 A3 | 8/2007 | |

OTHER PUBLICATIONS

Eck, M. et al., "Multiresolution Analysis of Arbitrary Meshes," *SIGGRAPH '95: Proceedings of the 22nd Annual Conferences on Computer Graphics and Interactive Techniques*, ACM Press, pp. 173-182.
Floater, M.S. et al., "Surface Parameterization: a Tutorial and Survey," *Advances in Multiresolution for Geometric Modeling*, N.A. Dodgson et al. (eds.), Springer: Berlin, pp. 157-186.
Joshi, P. et al., "Harmonic Coordinates for Character Articulation," *ACM Transactions on Graphics*, Jul. 2007, vol. 26, No. 3, Article 71, pp. 71-1-71-9.
Kähler, K. et al., "Head shop: Generating animated head models with anatomical structure," *Proceedings of the 2002 ACM SIGGRAPH/Eurographic Symposium on Computer Animation*, 2002, 9 pages.

(Continued)

*Primary Examiner* — Kee M Tung
*Assistant Examiner* — Sing-Wai Wu
(74) *Attorney, Agent, or Firm* — Kilpatrick Townsend & Stockton LLP (57) ABSTRACT

Systems and methods are disclosed allowing data and other information from one model to be transferred to another model. A surface correspondence between meshes of the models can be created that provides a transfer or sharing of information to include all points of one mesh and all points of the other mesh. Additionally, a volume correspondence between the models can be created to transfer information found within corresponding volumes or other n-D spaces associated with the models. Mesh information and other data at, near, or otherwise within a volume or other n-D space associated with one model can be "pushed through" the volume correspondences to transfer the data to its designated location on, at, near, or otherwise within a corresponding volume or other n-D space associated with the other model.

15 Claims, 7 Drawing Sheets

OTHER PUBLICATIONS

Lee, A.W.F. et al., "Multiresolution Mesh Morphing," *SIGGRAPH 99: Proceedings of the 26th Annual Conference on Computer Graphics and Interactive Techniques*, ACM Press/Addison-Wesley Publishing Co., pp. 343-350.

Praun, E. et al., "Consistent Mesh Parameterizations," *SIGGRAPH 2001 Proceedings of the 28th Annual Conference on Computer Graphics and Interactive Techniques*, ACM Press, pp. 179-184.

Kraevoy, et al., "Cross-parameterization and compatible remeshing of 3D models," 2004, ACM Transactions on Graphics, vol. 23, No. 3, pp. 861-869, Proceedings of SIGGRAPH 2004.

* cited by examiner

MESH TRANSFER IN N-D SPACE

CROSS-REFERENCES TO RELATED APPLICATIONS

This application may be related to the following commonly assigned applications:

U.S. patent application Ser. No. 12/200,704, filed Aug. 28, 2008 and entitled "Mesh Transfer."

U.S. patent application Ser. No. 12/200,719, filed Aug. 28, 2008 and entitled "Mesh Transfer Using UV-Space."

U.S. patent application Ser. No. 12/200,739, filed Aug. 28, 2008 and entitled "Mesh Transfer for Shape Blending."

The respective disclosures of these applications are incorporated herein by reference in their entirety for all purposes.

BACKGROUND

This disclosure relates to computer animation and computer generated imagery. More specifically, this disclosure related to techniques for transferring information from one computer model in n-D space.

With the wide-spread availability of computers, animators and computer graphics artists can rely upon computers to assist in the animation and computer generated imagery process. This may include using computers to have physical models be represented by virtual models in computer memory. This may also include using computers to facilitate animation, for example, by the designing, posing, deforming, coloring, painting, or the like, of characters or other elements of a computer animation display.

Pioneering companies in the computer-aided animation/computer generated imagery (CGI) industry can include Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms specially designed for computer animation and CGI, now known as RenderMan®. RenderMan® is now widely used in the film industry and the inventors have been recognized for their contributions to RenderMan® with multiple Academy Awards®.

One core functional aspect of RenderMan® software can include the use of a "rendering engine" to convert geometric and/or mathematical descriptions of objects or other models into images. This process is known in the industry as "rendering." For movies or other features, a user (e.g., an animator or other skilled artist) specifies the geometric description of a model or other objects, such as characters, props, background, or the like that may be rendered into images. An animator may also specifying poses and motions for objects or portions of the objects. In some instances, the geometric description of objects may include a number of animation variables (avars), and values for the avars.

The production of animated features and CGI may involve the extensive use of computer graphics techniques to produce a visually appealing image from the geometric description of an object or model that can be used to convey an element of a story. One of the challenges in creating models for use in animated features can be balancing the desire for a visually appealing image of a character or other object with the practical issues involved in allocating the computational resources required to produce those visually appealing images. Often the geometric descriptions of objects or models at various stages in a feature film production environment may be rough and course, lacking the realism and detail that would be expected of the final production.

One issue with the production process is the time and effort involved when an animator undertakes to create the geometric description of a model and the models associated avars, rigging, shader variables, paint data, or the like. Even with models that lack the detail and realism expected of the final production, it may take several hours to several days for an animator to design, rig, pose, paint, or otherwise prepare the model for a given state of the production process. Further, although the model need not be fully realistic at all stages of the production process, it can be desirable that the animator or artist producing the model be able to modify certain attributes of the model at any stage. However, modifying the model during the production process may also involved significant time and effort. Often, there may not be sufficient time for desired modifications in order to maintain a release schedule.

Accordingly, what is desired is to solve problems relating to transferring information between meshes, some of which may be discussed herein. Additionally, what is desired is to reduce drawbacks related to transferring information between meshes, some of which may be discussed herein.

SUMMARY

In various embodiments, data and other information from one model can be transferred to another model. A surface correspondence between meshes of the models can be created that provides a transfer or sharing of information to include all points of one mesh and all points of the other mesh. Additionally, a volume correspondence between the models can be created to transfer information found within corresponding volumes or other n-D spaces associated with the models. Mesh information and other data at, near, or otherwise within a volume or other n-D space associated with one model can be "pushed through" the volume correspondences to transfer the data to its designated location on, at, near, or otherwise within a corresponding volume or other n-D space associated with the other model. The volume correspondence between each of the models can enable animators and other digital artists to create new characters from existing characters that may have different topologies and geometries. Additionally, the volume correspondence may be created between different versions of the same character, thereby allowing the animator to implement changes to characters at later stages of the production process and transfer information from prior versions thereby preserving previous work product and reducing the time and cost of updating the characters.

In some embodiments, a surface correspondences for sharing or transferring information between models can be generated based on a pair of "feature curve networks." A surface correspondence can be generated using one or more geometric primitives (e.g., points, lines, curves, volumes, etc.) associated with a source surface, such as a portion of a source mesh, and corresponding geometric primitives associated with a destination surface. For example, a collection "feature curves" may be created to partition the source and destination surfaces into a collection of "feature regions" at "features" or other prominent aspects of a model. The resulting collections of partitions or "feature curve networks" can be used to construct a full surface correspondence between all points of the source mesh and all points of the destination mesh.

In further embodiments, the surface correspondence between one model and another model may be used to generate a volume correspondence. A volume correspondence may be generated based on a pair of surfaces and at least one additional pair of surfaces from which a volume or other n-D space can be defined. The resulting volume correspondence can be used to share or transfer information between all points within a volume or other n-D space defined for a source model and all points within a corresponding volume or other n-D space defined for a destination model. In at least one embodiment, the volume correspondence can be built using a harmonic deformation correspondence.

A volume correspondence in some embodiments can be authored on a source model by a user drawing or placing one or more corresponding feature curves on a source mesh and a destination mesh. The user may draw or place corresponding pairs of surfaces external to the models or within the models to define a volume of other n-D space. The volume correspondence may be generated in response to the corresponding feature curves on the source and destination meshes and the corresponding pairs of surfaces that define the volume or other n-D space.

The information sharing between two or more meshes may unidirectional or bidirectional based on the correspondences. Thereby, information may be shared between two or more meshes, such as scalar fields, variables, controls, avars, articulation data, character rigging, shader data, lighting data, paint data, simulation data, topology and/or geometry, re-meshing information, map information, or the like.

A further understanding of the nature, advantages, and improvements offered by those inventions disclosed herein may be realized by reference to remaining portions of this disclosure and any accompanying drawings.

BRIEF DESCRIPTION OF THE DRAWINGS

In order to better describe and illustrate embodiments and/or examples of any inventions presented within this disclosure, reference may be made to one or more accompanying drawings. The additional details or examples used to describe the accompanying drawings should not be considered as limitations to the scope of any of the disclosed inventions, any of the presently described embodiments and/or examples, or the presently understood best mode of any invention presented within this disclosure.

DETAILED DESCRIPTION OF EXEMPLARY EMBODIMENTS

Techniques and tools can be implemented that assist in the production of computer animation and computer graphics imagery. A mesh can be the structure that gives shape to a model. The mesh of a model may include, in addition to information specifying vertices and edges, various additional pieces of information. In various embodiments, point weight groups, shader variables, articulation controls, hair variables and styles, paint data, or the like, can be shared between meshes having different topologies and geometries. Information associated with the mesh of one character can be shared with or transferred to the mesh of another character, even from one character to another completely different character and between different versions of the same character.

A correspondence build between a source mesh and a destination mesh can provide the sharing of information on, at, or near one mesh to designated locations of another mesh. In various embodiments, the correspondence may be constructed between all points on surfaces of the meshes, rather than merely mesh vertices alone. This surface correspondence may be used to create a volume correspondence between all points on or within volumes associated with the meshes.

In various embodiments, the correspondences may be authored by drawing out points, lines, curves, etc. on a source mesh and associated points, lines, curves, etc. on a destination mesh. These may correspond to features or other prominent aspects of models provide by the meshes. Volumes created by authoring on and/or near the meshes can be parameterized such that a full volume correspondence is created between all points in the volume of the source mesh and all points in the volume of the destination mesh, without requiring identical topologies and/or geometries.

Figure 1:
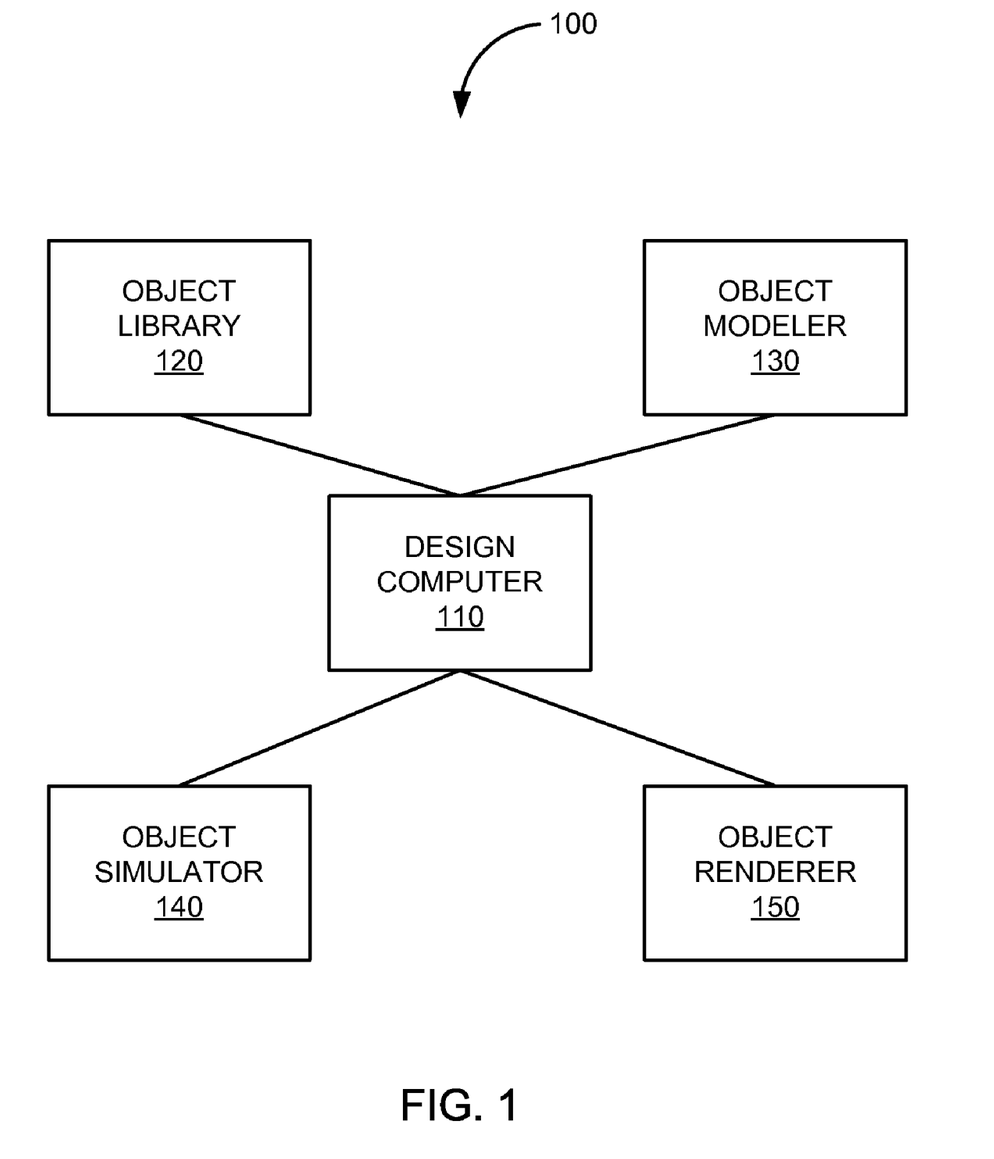
FIG. 1 is a simplified block diagram of a system for creating computer animations and computer graphics imagery that may implement or incorporate various embodiments of an invention whose teachings may be presented herein.

FIG. 1 is a simplified block diagram of system 100 for creating computer animations and computer graphics imagery that may implement or incorporate various embodiments of an invention whose teachings may be presented herein. In this example, system 100 includes design computer 110, object library 120, object modeler 130, object simulator 140, and object render 150.

Design computer 110 can be any PC, laptop, workstation, mainframe, cluster, or the like. Object library 120 can be any database configured to store information related to objects that may be designed, posed, animated, simulated, rendered, or the like.

Object modeler 130 can be any hardware and/or software configured to model objects. Object modeler 130 may generate 2-D and 3-D object data to be stored in object library 120. Object simulator 140 can be any hardware and/or software configured to simulate objects. Object simulator 140 may generate simulation data using physically-based numerical techniques. Object renderer 150 can be any hardware and/or software configured to render objects. For example, object renderer 150 may generate still images, animations, motion picture sequences, or the like of objects stored in object library 120.

Figure 2:
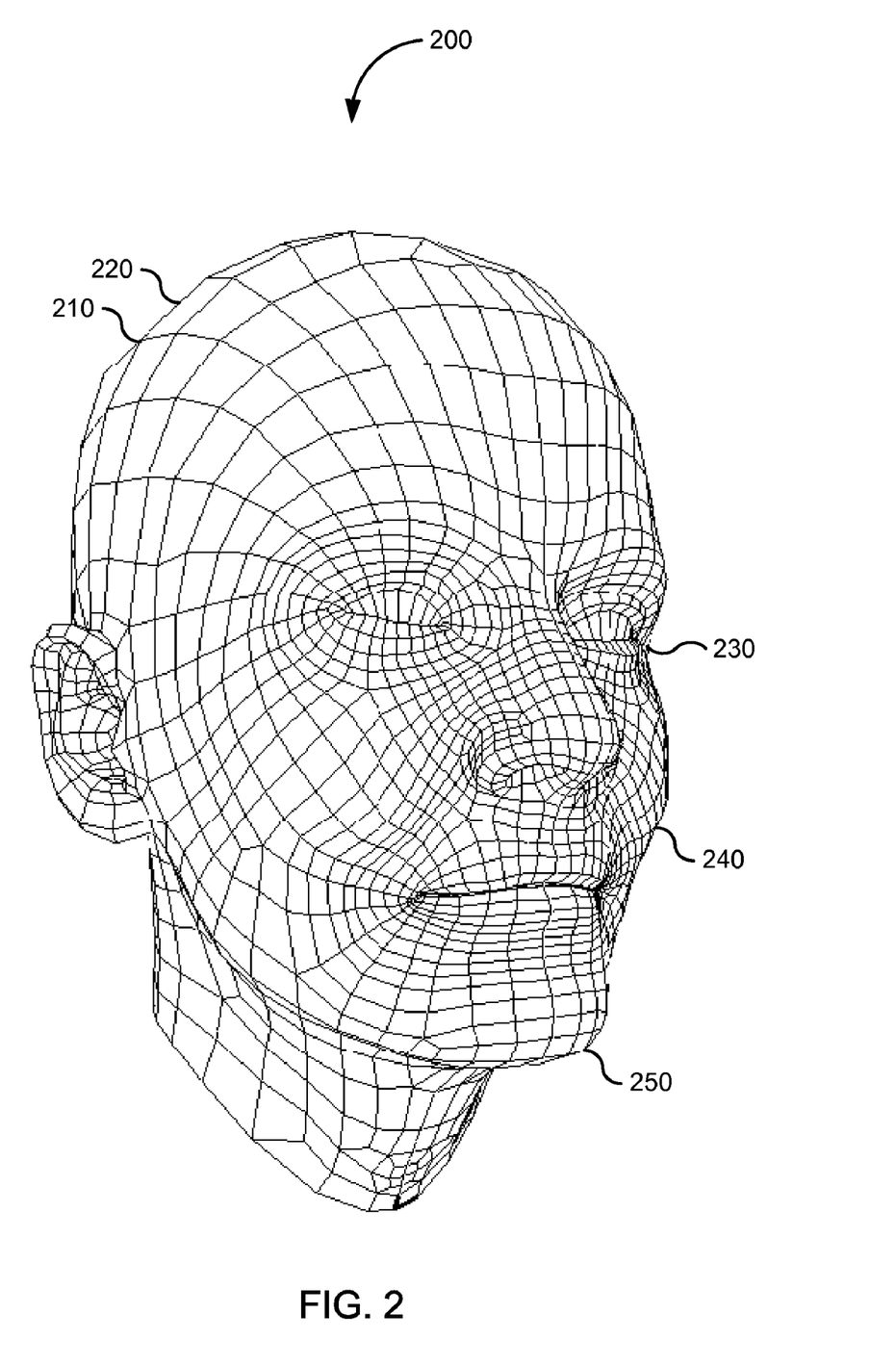
FIG. 2 is an illustration of a mesh for a head of a human character.

FIG. 2 is an illustration of mesh 200 for a head of a human character model in one embodiment. Mesh 200 can be created or modeled as a collection of faces (e.g., triangles, quadrilaterals, or other polygons), formed by interconnecting a collection of vertices. In this example, a collection of polygons interconnect at vertex 210. Polygons may interconnect at vertex 210 to share an edge (e.g., edge 220). Any number of polygons and vertices may be used to form mesh 200. The number of polygons may be dependent on user preference, the desired topology, geometry, realism, detail, or the like.

Motion of a model associated with mesh 200 may be realized by controlling mesh 200, for example by controlling vertices 230, 240, and 250. Polygons and vertices of mesh 200 may be individually animated by moving their location in space (x, y, z) for each displayed frame of a computer animation. Polygons and vertices of mesh 200 may also move together as group, maintaining constant relative position. Thus, for example, by raising vertices of mesh 200 by appropriate amounts at the corners of lips on the head of the human character, a smiling expression can be formed. Similarly, vertices of mesh 200 located at or near features or other prominent aspects of the model created by mesh 200, such as eyebrows, cheeks, forehead, etc. may be moved to deform the head of the human character to form a variety of expressions.

In addition to controlling character deformations, information can be "attached to" mesh 200 to provide other functional and/or decorative purposes. For example, mesh 200 may be connected to skeletons, character rigging, or other animations controls and avars used to animate, manipulate, or deform the model via mesh 200. Further, fields of data and/or variables specifying color, shading, paint, texture, etc. can be located at certain vertices or defined over surfaces of mesh 200. As discussed above, constructing mesh 200 and placing all of this information on mesh 200 can be a time consuming process. This process may limit how many characters or other objects may be created, the topologies and geometries of those models, and what changes can be made during various stages in the production of animations, such as feature-length films.

Figure 3A:
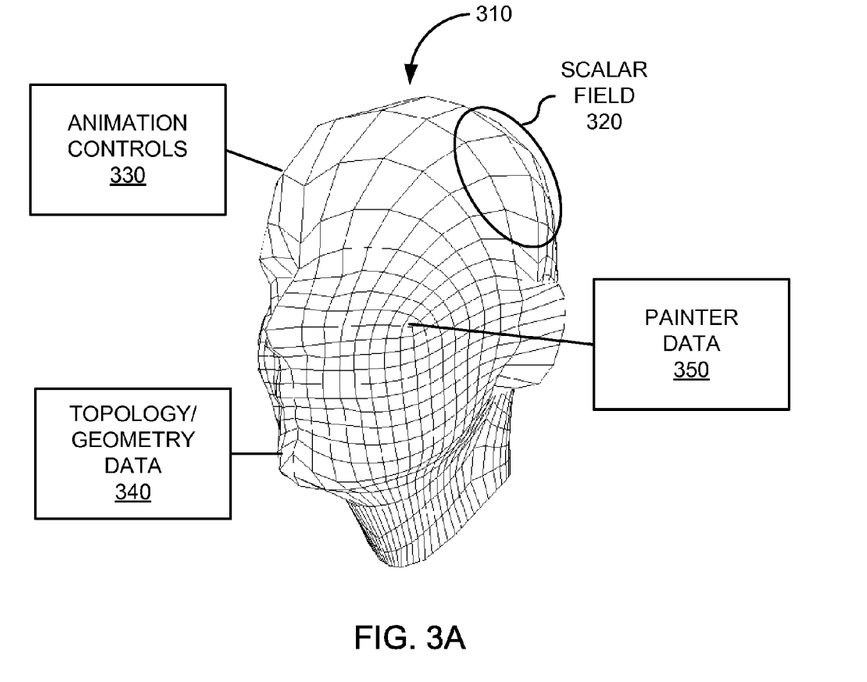
FIG. 3A is an illustration a mesh including various pieces of associated information.

FIG. 3A is an illustration mesh 310 including various pieces of associated information. Mesh 310 can include scalar field 320, animations controls 330, topology/geometry data 340, and painter data 350. Scalar field 320 may include a distribution of values or variables over a portion of mesh 310. The values or variables associated with scalar field 320 may include shader variables, point weight groups, the location of hair/fur objects, or the like. Topology/geometry data 340 may include information that defines or describes a locality in terms of its layout, structure, or level of detail. Painter data 350 may include information, such as coloring and textures, placed by an animator or designer at a specific location on mesh 310.

In various embodiments, new models can be created and existing models can be more readily updated using techniques of this disclosure that allow animators to overcome some of the timing constraints involved in creating models. Additionally, the time and effort put into designing one model can be preserved allowing the prior work and effort performed by the animator to be shared with or copied to another model. In some embodiments, a correspondence can be created that allows information present at or on a mesh to be shared with another mesh. The correspondence can reduce the time required to create new models, or the update existing models at later stages of the production process. Thus, animation controls, rigging, shader and paint data, etc. can be authored once on a character, and shared or transferred to different version of the same character or to another character of completely different topology and geometry.

In the example of FIG. 3A, mesh 310 may represent an initial or preliminary version of a character. For example, mesh 310 may include a number of polygons that provide a character with just enough detail with which an animator, designer, or other graphics artist may work. The number of polygons may be relatively small compared to the number of polygons for a final or production version of the character having lifelike or the final desired detail and/or realism. The relatively small size of mesh 310 may allow the character associated with mesh 310 to be quickly posed, animated, rigged, painted, or rendered in real-time, allowing an animator to see quick results early in production process.

Figure 3B:
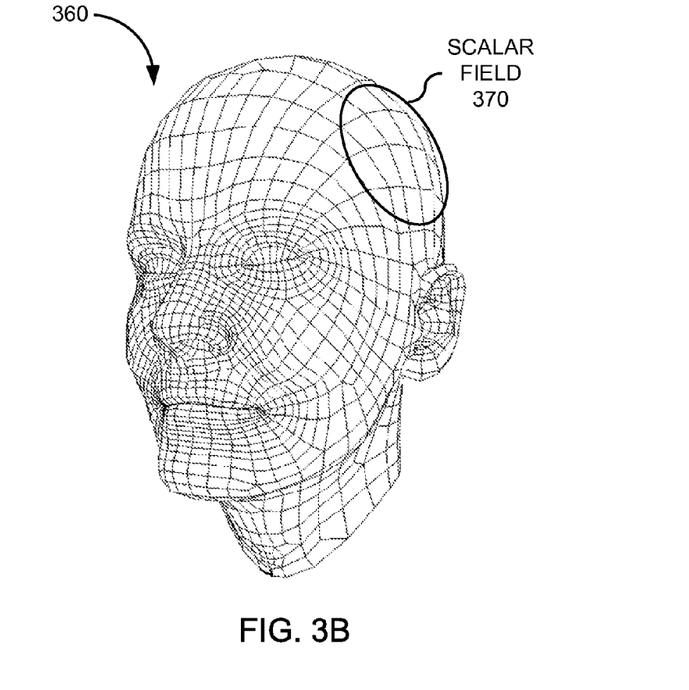
FIG. 3B is an illustration of a mesh in various embodiments with which information associated with the mesh of FIG. 3A may be shared.

Referring to FIG. 3B, mesh 360 may represent a production or final version of the character. Mesh 360 may include a relatively higher or larger number of polygons with respect to initial or preliminary versions of the character to provide more realistic detail in each rendered frame. In this example, mesh 360 can include scalar field 370. Scalar field 370 may be identical to, similar to, or otherwise include some relationship with scalar field 320. For example, both may represent how the head of the character is to be shaded or how hair is to be placed.

In various embodiments, one or more correspondences may be created that allow information associated with mesh 310 to be readily shared with or transferred to mesh 360. Scalar field 320, animations controls 330, topology/geometry data 340, and/or painter data 350 can be "pushed" through a correspondence between mesh 310 and mesh 360. For example, scalar field 320 can be transferred to mesh 360 to create scalar field 370. Thus, once correspondences are created between meshes, any information at or on one mesh may be shared with another mesh. This can allow sharing of information even if one mesh includes differing topologies and geometries from other meshes.

Figure 4:
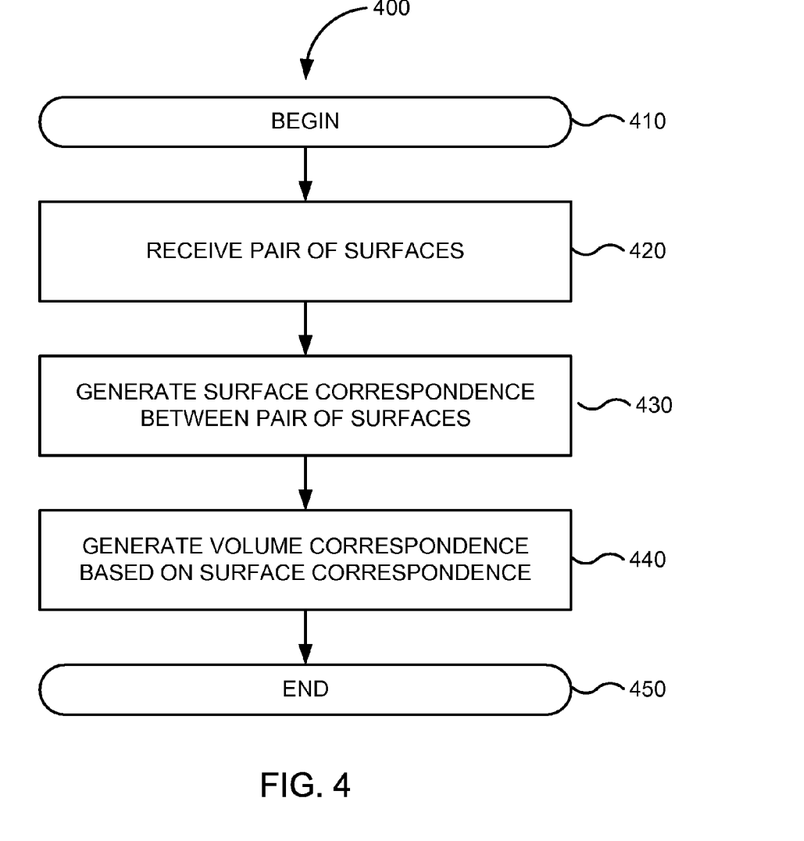
FIG. 4 is a simplified flowchart of a method in various embodiments for generating a volume correspondence between meshes for sharing information between the meshes.

FIG. 4 is a simplified flowchart of a method in various embodiments for generating a volume correspondence between meshes for sharing information between the meshes. The processing depicted in FIG. 4 may be performed by software modules (e.g., instructions or code) executed by a processor of a computer system, by hardware modules of an electronic device, or combinations thereof. FIG. 4 begins in step 410.

In step 410, a pair of surfaces is received. For example, information may be received specifying a surface or region of a source mesh and a corresponding surface or region of a destination mesh. The pair of surfaces may be authored by a user or determined based on one or more discontinuities, parameterizations, or the like. Feature curves may be used to partition a source mesh and a destination mesh into a pair of feature curve networks as discussed in U.S. patent application Ser. No. 12/200,704, filed Aug. 28, 2008 and entitled "Mesh Transfer," the entire disclosure of which is herein incorporated by reference. The pair of surfaces may be identified within the pair of feature curve networks.

In step 420, a surface correspondence is generated based on the pair of surfaces. The surface correspondence can include functions, relationships, correlations, etc. between one or more points associated with a first surface and one or more points associated with a second surface. The surface correspondence may include a mapping from every location on the first surface to a unique location on the second surface. The correspondence may map one or more points, curves, surfaces, regions, objects, or the like, associated with the first object to one or more points, curves, surfaces, regions, objects, or the like associated with the second object.

In various embodiments, a parameterization is built for source and destination meshes over a common domain. This common parameter domain can then be used to build the global and continuous surface correspondence between all points of the source and destination surfaces. The basic framework of the parameterization may rely on user-supplied points, user-supplied curves, inferred discontinuities, or the like. In some embodiments, the parameterization may include a set of feature curves defining a feature curve network.

In step 430, a volume correspondence is generated based on the surface correspondence. The volume correspondence can include functions, relationships, correlations, etc. between one or more points associated with a first volume or other n-D space and one or more points associated with a second volume or n-D space. The volume correspondence may include a mapping from every location on and within the first volume to a unique location on or within the second volume. The correspondence may map one or more points, curves, surfaces, regions, objects, volumes, n-D spaces, (n-1)-D spaces, or the like, associated with a first object to one or more corresponding points, curves, surfaces, regions, objects, volumes, n-D spaces, (n-1)-D spaces, or the like associated with a second object.

In some embodiments, the volume correspondence may include a harmonic deformation correspondence. The harmonic deformation correspondence may provide non-negativity and interior locality for volume deformation techniques using a topologically flexible structure, called a cage, that may consists of a closed three dimensional mesh. The cage can optionally be augmented with additional interior vertices, edges, and faces to more precisely control the interior behavior of the deformation. Harmonic coordinates can be generalized barycentric coordinates that can be extended to any dimension, providing non-negativity in strongly concave situations, and having magnitudes that fall off with distance as measured within the cage. FIG. 4 ends in step 450.

Figure 5:
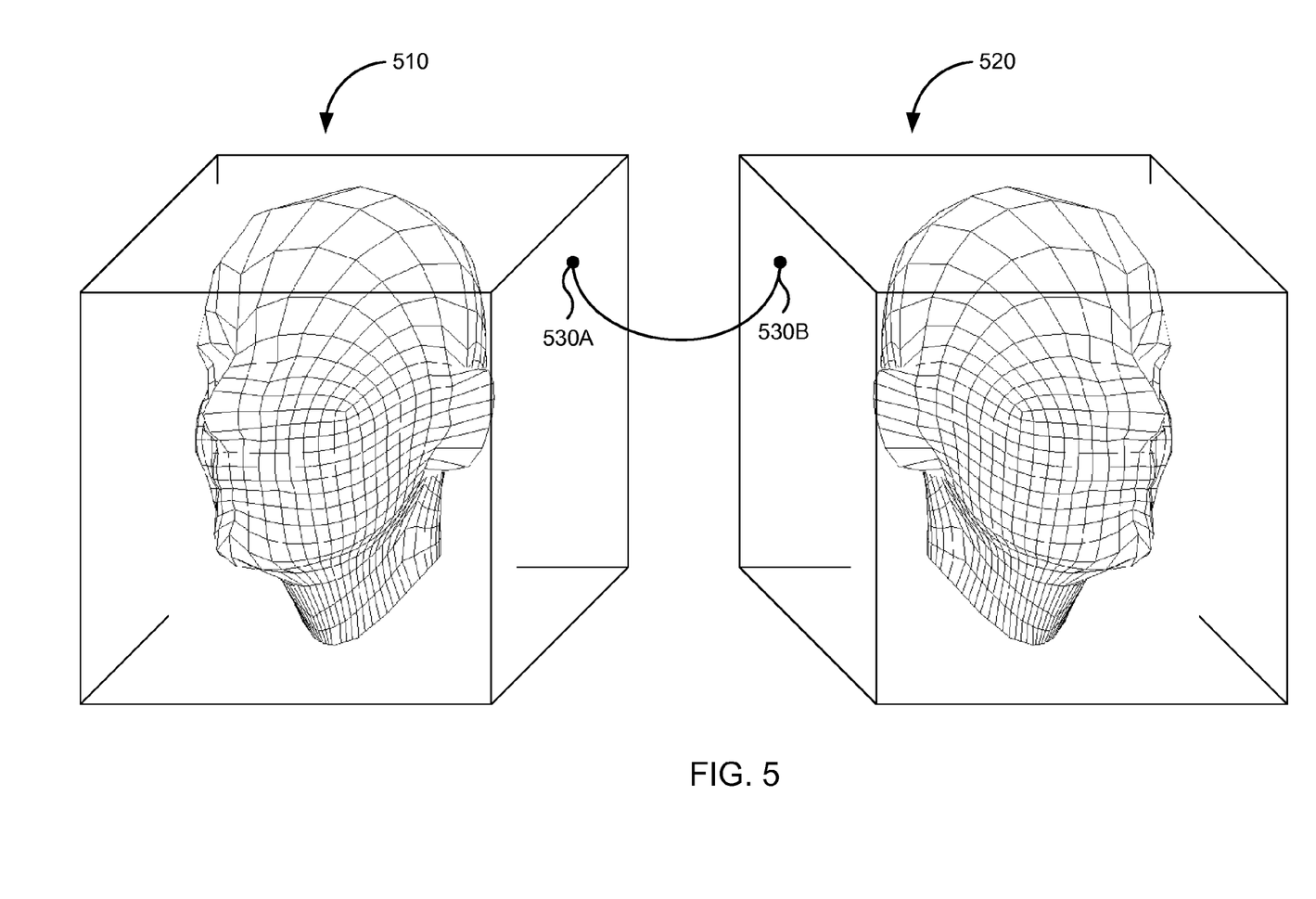
FIG. 5 is an illustration of a volume correspondence between a first volume and a second volume in some embodiments.

FIG. 5 is an illustration of a volume correspondence between volume 510 and volume 520. In this example, a cube can be constructed to represent volume 510. Found within volume 510 is a mesh object in the form of a human head. A corresponding cube can be constructed to represent volume 520. The volume correspondence can provide a mapping from every location in or on volume 510 to a unique location in or on volume 520. In one example, point 530A can be mapped via the volume correspondence to point 530B.

Accordingly, information may be shared or otherwise transferred between a first mesh and a second mesh based on the volume correspondence. The information may include character rigging, topology data, geometry data, shader variables, hair objects, information or objects within a proximity to either mesh, painter data, or the like, that may be found at, found near, found on, found in, protruding from, or extending into an object. The transfer of information may occur from a first mesh to a second mesh. The transfer may also occur from the second mesh to the first mesh.

Figure 6:
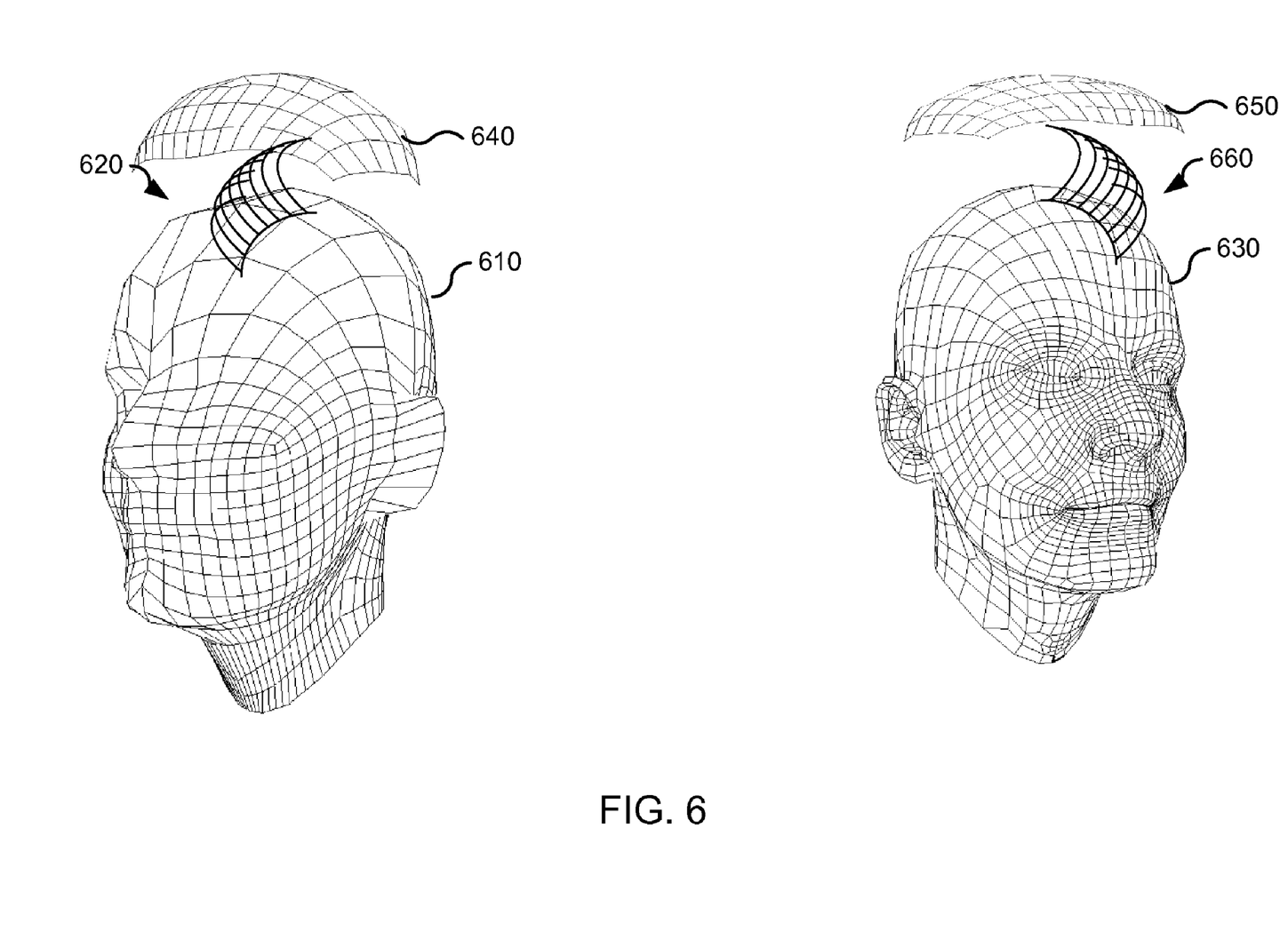
FIG. 6 illustrates a first mesh and a corresponding second mesh for transferring hair styles in one embodiment.

FIG. 6 illustrates a first mesh and a corresponding second mesh for transferring hair styles in one embodiment. As shown in FIG. 6, mesh 610 is formed to represent a head of a human character. An animator or other artist may construct a hair style 620 (e.g., a mohawk) for the character. Hair style 620 may include linear objects, fields, variables, lighting information, or the like, for example, to represent the hair, its position relative to mesh 610, position of individual hairs or objects with respect to each other, how the hair interacts with other objects, or the like. In this example, hair style 620 can be placed on top of mesh 610, substantially in the center.

In one embodiment, the location or position of hair variables or hair objects associated with hair style 620 may be shared or otherwise transferred to other objects using a surface correspondence. A first set of feature curves may be authored or otherwise placed on mesh 610 to create a first feature curve network. A corresponding second set of feature curves may be authored or otherwise placed on mesh 630 to create a second set of feature curves. A surface correspondence may be generated that maps points or locations on mesh 610 to points or locations on mesh 630. Information at or near a point on mesh 610 can be transferred to a corresponding point on mesh 630.

In further embodiments, hair style 620 may be shared or otherwise transferred to other objects using a volume correspondence. For example, the surface correspondence between mesh 610 and 630 may allow the mapping of the points at which hair objects are connected to mesh 610, and thus are associated with a partition create by the first feature curve network. The surface correspondence may be extending in one or more dimensions using points, lines, curves, surfaces, surface regions, or other geometric primitives and objects that may be placed relative of a surface associated with mesh 610 to construct volumes or other n-D spaces. Corresponding volumes or other n-D spaces may be constructed for mesh 630. A volume correspondence may be created based on the surface correspondence that maps points or locations within a first volume or n-D space to unique points or locations in a corresponding volume or n-D space.

For example, surface 640 may be positioned relative to mesh 610. Based on all or a portion of mesh 610 (e.g., the surface or region below hair style 620) and surface 640 a volume or other n-D space may be constructed. A corresponding surface 650 may be positioned relative to destination mesh 630. Based on all or a portion of mesh 630 (e.g., a surface region on the scalp where hairs are desired to be placed) and surface 650 a corresponding volume or other n-D space may be constructed. Information associated with hair style 630, such as torsion and spring variables, can be transferred between corresponding volumes or n-D spaces based on the volume correspondence to create hair style 660. Other transformations, such as scaling, rotation, translation, or the like may occur during or post transfer.

Accordingly, the creation of volume correspondences between meshes, and the transfer of information can be applied to a range of applications. For example, information may be shared between characters. As mentioned above, without requiring a common mesh topology, sharing can be accomplished between meshes with far more topological flexibility. In another example, the flexibility of evolving characters may be achieved. As the design of a character evolves, the geometry and mesh topology of the character may change. Changes can be made to variables, hair style parameters, clothing, or the like, and transferred between models.

Figure 7:
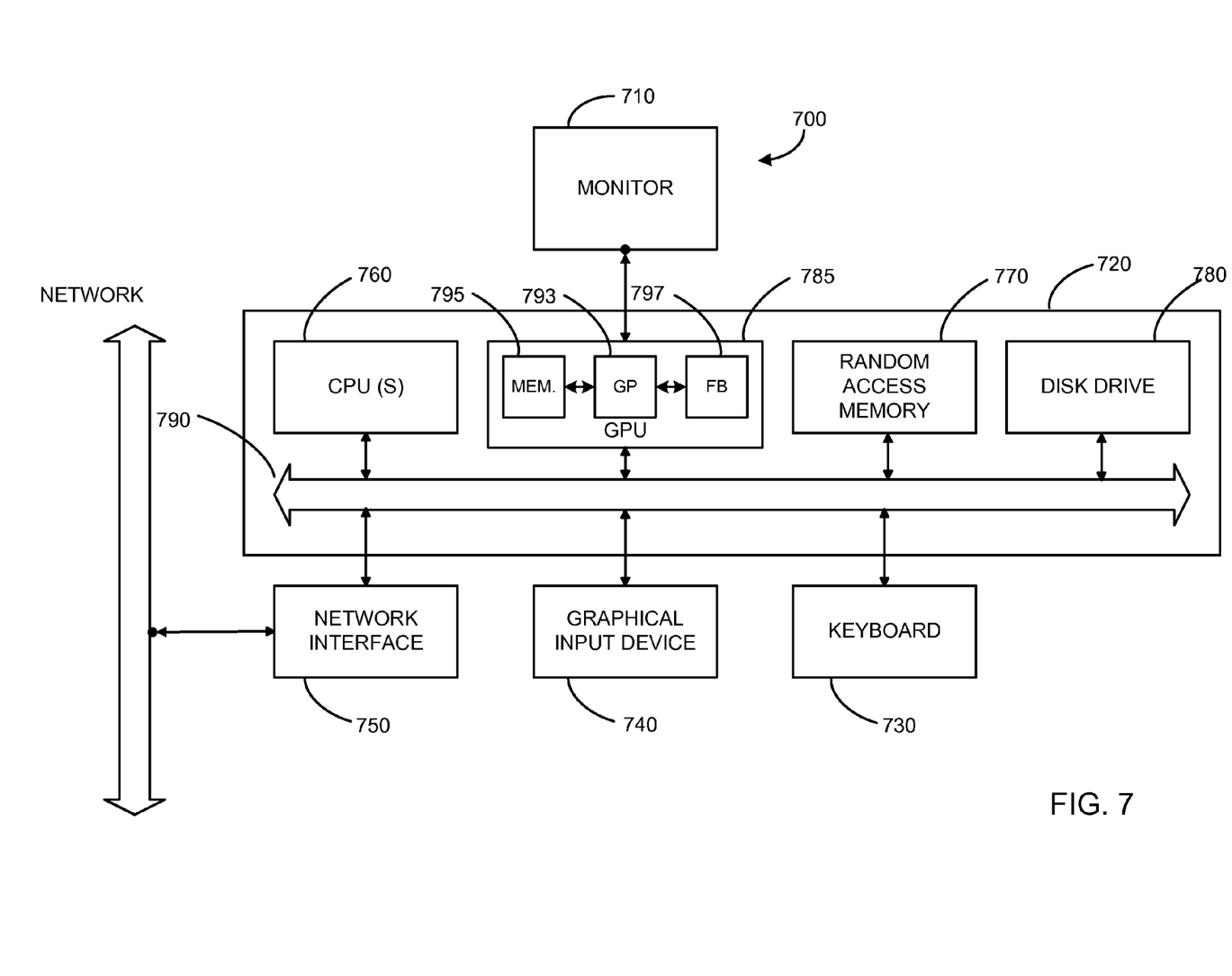
FIG. 7 is a block diagram of a block diagram of a computer system or information processing device that may be used to implement or practice various embodiments of an invention whose teachings may be presented herein.

FIG. 7 is a block diagram of computer system 700 that may be used to implement or practice various embodiments of an invention whose teachings may be presented herein. FIG. 7 is merely illustrative of a general-purpose computer system or specific information processing device for an embodiment incorporating an invention whose teachings may be presented herein and does not limit the scope of the invention as recited in the claims. One of ordinary skill in the art would recognize other variations, modifications, and alternatives.

In one embodiment, computer system 700 can include monitor 710, computer 720, keyboard 730, user input device 740, computer interfaces 750, or the like. Monitor 710 may typically include familiar display devices, such as a television monitor, a cathode ray tube (CRT), a liquid crystal display (LCD), or the like. Monitor 710 may provide an interface to user input device 740, such as incorporating touch screen technologies.

Computer 720 may typically include familiar computer components, such as processor 760 and one or more memories or storage devices, such as random access memory (RAM) 770, one or more disk drives 780, graphics processing unit (GPU) 785, or the like. Computer 720 may include system bus 790 interconnecting the above components and providing functionality, such as inter-device communication.

In further embodiments, computer 720 may include one or more microprocessors (e.g., single core and multi-core) or micro-controllers, such as PENTIUM, ITANIUM, or CORE 2 processors from Intel of Santa Clara, Calif. and ATHLON, ATHLON XP, and OPTERON processors from Advanced Micro Devices of Sunnyvale, Calif. Further, computer 720 may include one or more hypervisors or operating systems, such as WINDOWS, WINDOWS NT, WINDOWS XP, VISTA, or the like from Microsoft or Redmond, Wash. SOLARIS from Sun Microsystems, LINUX, UNIX, and UNIX-based operating system.

In various embodiments, user input device 740 may typically be embodied as a computer mouse, a trackball, a track pad, a joystick, a wireless remote, a drawing tablet, a voice command system, an eye tracking system, or the like. User input device 740 may allow a user of computer system 700 to select objects, icons, text, user interface widgets, or other user interface elements that appear on monitor 710 via a command, such as a click of a button or the like.

In some embodiments, computer interfaces 750 may typically include a communications interface, an Ethernet card, a modem (telephone, satellite, cable, ISDN), (asynchronous) digital subscriber line (DSL) unit, FireWire interface, USB interface, or the like. For example, computer interfaces 750 may be coupled to a computer network, to a FireWire bus, a USB hub, or the like. In other embodiments, computer interfaces 750 may be physically integrated as hardware on the motherboard of computer 720, may be implemented as a software program, such as soft DSL or the like, or may be implemented as a combination thereof.

In various embodiments, computer system 700 may also include software that enables communications over a network, such as the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 700.

RAM 770 and disk drive 780 are examples of machine-readable articles or computer-readable media configured to store information, such as computer programs, executable computer code, human-readable source code, shader code, rendering enginges, or the like, and data, such as image files, models including geometrical descriptions of objects, ordered geometric descriptions of objects, procedural descriptions of models, scene descriptor files, or the like. Other types of computer-readable storage media or tangible machine-accessible media include floppy disks, removable hard disks, optical storage media such as CD-ROMS, DVDs and bar codes, semiconductor memories such as flash memories, read-only-memories (ROMS), battery-backed volatile memories, networked storage devices, or the like.

In some embodiments, GPU 785 may include any conventional graphics processing unit. GPU 785 may include one or more vector or parallel processing units that may be user programmable. Such GPUs may be commercially available from NVIDIA, ATI, and other vendors. In this example, GPU 785 can include one or more graphics processors 793, a number of memories and/or registers 795, and a number of frame buffers 797.

As suggested, FIG. 7 is merely representative of a general-purpose computer system or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A computer-implemented method for transferring information between objects, the method comprising:
   receiving, at one or more computer systems, information identifying a pair of surfaces;
   receiving, at the one or more computer systems, information identifying a first pair of feature curve networks associated with the pair of surfaces, each feature curve in a one feature curve network in the first pair of feature curve networks positioned on one surface in the pair of surfaces and in correspondence with at least one feature curve in the other feature curve network in the first pair of feature curve networks positioned on the other surface in the pair of surfaces;

receiving, at the one or more computer systems, information identifying a second pair of feature curve networks associated with the pair of surfaces, each feature curve in one feature curve network in the second pair of feature curve networks positioned off one surface in the pair of surfaces and in correspondence with at least one feature curve in the other feature curve network in the second pair of feature curve networks positioned off the other surface in the pair of surfaces;

generating, with one or more processors associated with the one or more computer systems, a surface correspondence between the pair of surfaces based on the first pair of feature curve networks;

generating, with the one or more processors associated with the one or more computer systems, a volume correspondence between one volume in a pair of volumes projecting from one surface in the pair of surfaces and at least one volume in the pair of volumes projecting from the other surface in the pair of surfaces based on the second pair of feature curve networks and the surface correspondence; and transferring, with the one or more processors associated with the one or more computer systems, information between one volume in the pair of volumes and the other volume in the pair of volumes based on the volume correspondence.

2. The method of claim 1 wherein generating the volume correspondence between the one volume in the pair of volumes projecting from one surface in the pair of surfaces and the at least one volume in the pair of volumes projecting from the other surface in the pair of surfaces further comprises generating the volume correspondence in response to another pair of surfaces.

3. The method of claim 2 further comprising:
generating a harmonic deformation correspondence based on the another pair of surfaces.

4. The method of claim 1 wherein receiving the information identifying the first pair of feature curve networks associated with the pair of surfaces comprises receiving information defining at least some of the feature curves in the first pair of feature curve networks in response to a parameterization of one surface in the pair of surfaces.

5. The method of claim 1 further comprising:
receiving a set of constraints associated with the pair of surfaces; and
wherein generating the volume correspondence further comprises generating the volume correspondence based on the set of constraints.

6. A non-transitory computer readable medium storing computer-executable code for transferring information between objects, the non-transitory computer readable medium comprising:
code for receiving information identifying a pair of surfaces;
code for receiving information identifying a first pair of feature curve networks associated with the pair of surfaces, each feature curve in a one feature curve network in the first pair of feature curve networks positioned on one surface in the pair of surfaces and in correspondence with at least one feature curve in the other feature curve network in the first pair of feature curve networks positioned on the other surface in the pair of surfaces;
code for receiving information identifying a second pair of feature curve networks associated with the pair of surfaces, each feature curve in one feature curve network in the second pair of feature curve networks positioned off one surface in the pair of surfaces and in correspondence with at least one feature curve in the other feature curve network in the second pair of feature curve networks positioned off the other surface in the pair of surfaces;

code for generating a surface correspondence between the pair of surfaces based on the first pair of feature curve networks;

code for generating a volume correspondence between one volume in a pair of volumes projecting from one surface in the pair of surfaces and at least one volume in the pair of volumes projecting from the other surface in the pair of surfaces based on the second pair of feature curve networks and the surface correspondence; and code for transferring information between one volume in the pair of volumes and the other volume in the pair of volumes based on the volume correspondence.

7. The non-transitory computer readable medium of claim 6 wherein the code for generating the volume correspondence between the one volume in the pair of volumes projecting from one surface in the pair of surfaces and the at least one volume in the pair of volumes projecting from the other surface in the pair of surfaces further comprises code for generating the volume correspondence in response to another pair of surfaces.

8. The non-transitory computer readable medium of claim 7 further comprising:
code for generating a harmonic deformation correspondence based on the another pair of surfaces.

9. The non-transitory computer readable medium of claim 6 wherein the code for receiving the information identifying the first pair of feature curve networks associated with the pair of surfaces comprises code for receiving information defining at least some of the feature curves in the pair of feature curve networks in response to a parameterization of one surface in the pair of surfaces.

10. The non-transitory computer readable medium of claim 6 further comprising:
code for receiving a set of constraints associated with the pair of surfaces; and
code for generating the volume correspondence based on the set of constraints.

11. A system for transferring information between objects, the system comprising:
a processor; and
a memory coupled to the processor, the memory configured to store a set of instructions which when executed by the processor become operational with the processor to:
receive information identifying a pair of surfaces;
receive information identifying a first pair of feature curve networks associated with the pair of surfaces, each feature curve in a one feature curve network in the first pair of feature curve networks positioned on one surface in the pair of surfaces and in correspondence with at least one feature curve in the other feature curve network in the first pair of feature curve networks positioned on the other surface in the pair of surfaces;
receive information identifying a second pair of feature curve networks associated with the pair of surfaces, each feature curve in one feature curve network in the second pair of feature curve networks positioned off one surface in the pair of surfaces and in correspondence with at least one feature curve in the other feature curve network in the second pair of feature curve networks positioned off the other surface in the pair of surfaces;

generate a surface correspondence between the pair of surfaces based on the first pair of feature curve networks;

generate a volume correspondence between one volume in a pair of volumes projecting from one surface in the pair of surfaces and at least one volume in the pair of volumes projecting from the other surface in the pair of surfaces based on the second pair of feature curve networks and the surface correspondence; and transfer information between one volume in the first pair of volumes and the other volume in the first pair of volumes based on the volume correspondence.

12. The system of claim 11 wherein the set of instructions become operational with the processor to generate the volume correspondence in response to another pair of surfaces.

13. The system of claim 12 wherein the set of instructions further become operational with the processor to generate a harmonic deformation correspondence based on the another pair of surfaces.

14. The system of claim 11 wherein the set of instructions become operational with the processor to receive the information identifying the first pair of feature curve networks associated with the pair of surfaces wherein at least some of the feature curves in the first pair of feature curve networks are generated in response to a parameterization of one surface in the pair of surfaces.

15. The system of claim 11 wherein the set of instructions further become operational with the processor to:

receive a set of constraints associated with the pair of surfaces; and generate the volume correspondence based on the set of constraints.

* * * * *